United States Patent
Tippmann et al.

(10) Patent No.: US 6,468,585 B2
(45) Date of Patent: Oct. 22, 2002

(54) METHOD OF PROVIDING A TEXTURED SURFACE TO A FLOOR SURFACE

(76) Inventors: Joseph R. Tippmann, HRC-33, Box 8419, Rapid City, SD (US) 57701; Vincent P. Tippmann, 8605 N. River Rd., New Haven, IN (US) 46774

( * ) Notice: Subject to any disclaimer, the term of this patent is extended or adjusted under 35 U.S.C. 154(b) by 0 days.

(21) Appl. No.: 09/766,841

(22) Filed: Jan. 23, 2001

(65) Prior Publication Data

US 2001/0032699 A1 Oct. 25, 2001

Related U.S. Application Data

(62) Division of application No. 09/212,387, filed on Dec. 16, 1998, now Pat. No. 6,190,490.

(51) Int. Cl.[7] .............................. B05D 1/12; B05D 5/02
(52) U.S. Cl. ..................... 427/203; 427/204; 427/419.2
(58) Field of Search ........................ 427/475, 180, 427/203–205, 407.1, 419.2; 156/279–280, 245; 52/309.13, 309.17, 515, 745.01

(56) References Cited

U.S. PATENT DOCUMENTS

| 3,676,208 A | * | 7/1972 | Griffin |
| 4,925,509 A | * | 5/1990 | Tippmann |
| 6,103,053 A | * | 8/2000 | Saylor, Jr. |

\* cited by examiner

*Primary Examiner*—Fred J. Parker
(74) *Attorney, Agent, or Firm*—Birch, Stewart, Kolasch & Birch, LLP

(57) ABSTRACT

A method of providing a textured surface to the floor of a refrigerated storage enclosure. The steps include applying a layer of resinous material over the surface of the floor, the surface being formed of a hardened material, placing a single layer of sand on the layer of resinous material, and applying a layer of clear epoxy resin over the layer of sand. The layer of sand is evenly applied, and the layer of clear epoxy resin applied over the layer of sand is permitted to harden.

4 Claims, 5 Drawing Sheets

METHOD OF PROVIDING A TEXTURED SURFACE TO A FLOOR SURFACE

This application is a divisional Application Ser. No. 09/212,387, filed on Dec. 16, 1998, U.S. Pat. No. 6,190,490 the entire contents of which are hereby incorporated by reference.

BACKGROUND OF THE INVENTION

This invention relates to insulated storage enclosures and more particularly to a method of making a monolithic storage enclosure out of assembled side, ceiling and base members cut from a single slab of polyurethane coated with a layer of fiberglass reinforced resinous material and the method of making a closure member therefor.

Heretofore, monolithic insulated storage enclosures of the type set forth in our U.S. Pat. No. 4,925,509 were constructed by securing a skid to a base of polyurethane by a layer of fiberglass reinforced resinous material and positioning the sides and ceiling members on the base to form the enclosure. A coating layer of fiberglass reinforced resinous material was then applied over the inside and outside surfaces of the erected base, side and ceiling members to secure the members to each other to form the enclosure. Application of the coating layer to the inside surfaces of the erected base, side and ceiling members was both difficult due to the limited space available to maneuver spraying equipment, etc., which increased as the overall size of the enclosure decreased, and to the health hazards associated with the equipment operator's difficulties with breathing in a confined space considering the nature of the relatively toxic resinous material which is applied to the surfaces in spray form. The method of constructing the closure member is also disclosed.

The method of the present invention overcomes the aforementioned difficulties of constructing enclosures of polyurethane coated on all surfaces with a layer of fiberglass reinforced resinous material by forming the base, side and ceiling members as part of a long horizontally-positioned continuous slab of polyurethane. The entrance and other desired openings are formed in the slab, the slab is coated on one side with a layer of fiberglass reinforced resinous material and the slab is then cut into sections representing the base, side and ceiling members. The side and ceiling members are arranged on the base with the precoated surface of each facing the inside of the formed enclosure. Thus, to essentially complete the enclosure, all that need be done is to apply another coating of the resinous material to the outside surfaces of the side and ceiling members. The present invention also includes the method of constructing the closure member for the enclosure.

It is, therefore, the primary object of the present invention to provide a superior method of constructing storage enclosures of the type made of polyurethane covered with a layer of fiberglass reinforced resinous material.

It is another object of the present invention to provide a method of constructing storage enclosures of the subject type wherein all of the inside surfaces are precoated, thus substantially eliminating the necessity of applying coating material while inside the enclosure.

It is a further object of the present invention to provide a method of constructing storage enclosures of the subject type wherein door jambs and the like are secured in place by the coating material.

It is a still further object of the present invention to provide a method of constructing a closure member for the enclosure.

It is yet another object of the present invention to provide a method of constructing storage enclosures of the subject type which result in cost savings due to greater labor efficiency, reduced material waste and healthier working environments.

These and other objects and advantages will become apparent to those skilled in the art when the foregoing is considered in conjunction with the following brief description of the drawings and detailed

DETAILED DESCRIPTION OF INVENTION

Figure 1:
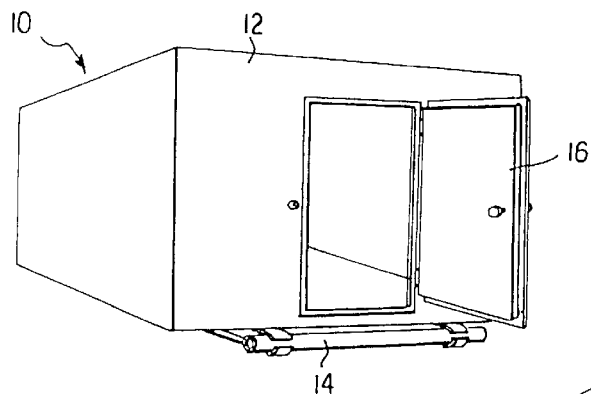
FIG. 1 is an oblique view of an enclosure constructed according to the method set forth in this invention.

Referring now to the drawings where like characters of reference indicate like elements in each of the several views, numeral 10 shows generally the frameless, insulated storage enclosure constructed by the method of the present invention. The enclosure comprises the principal elements of a substantially rectangular box-shaped, monolithic shell 12 mounted on a transport skid 14. The shell 12 also has a freezer-type insulated closure or door 16 mounted thereon.

Figure 5:
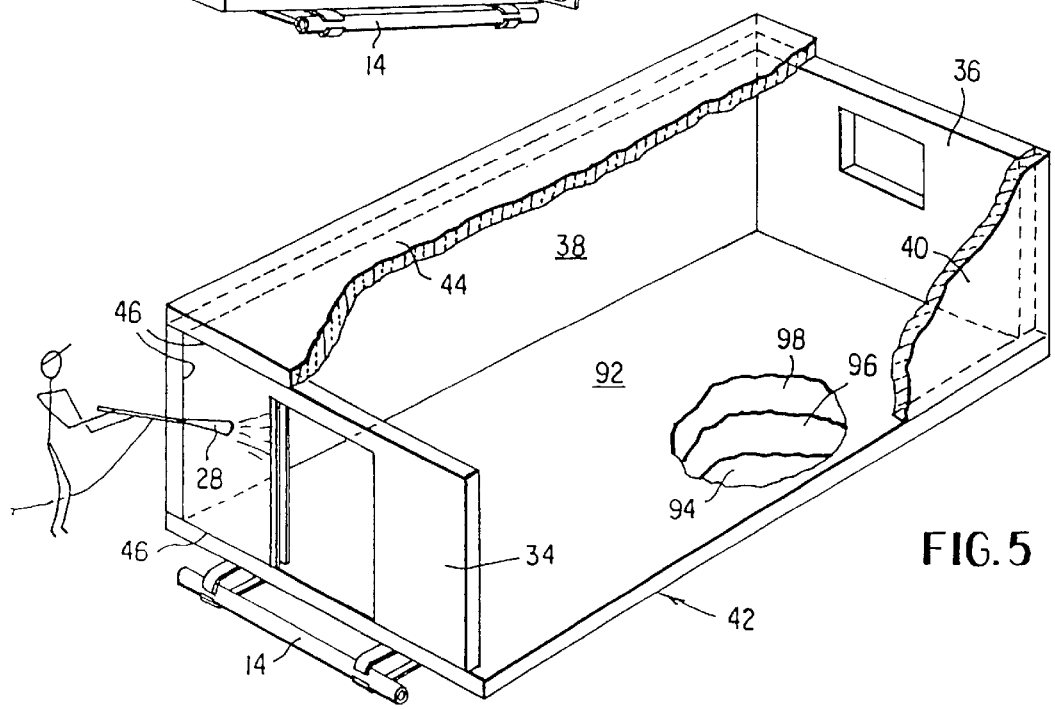
FIG. 5 is an oblique view of the erected base, side and ceiling members with parts broken away.
Figure 2:
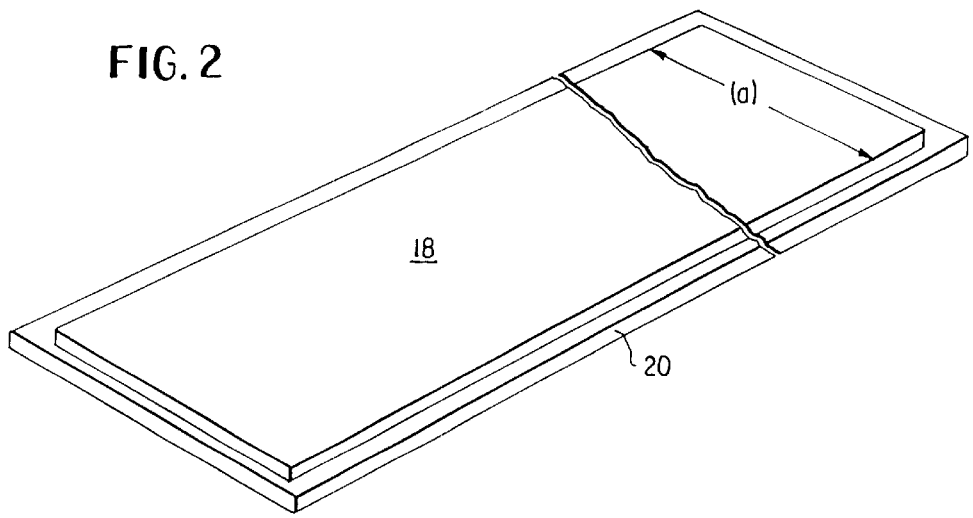
FIG. 2 is an oblique view of the elongated slab from which the side and ceiling members of the enclosure are formed.
Figure 3:
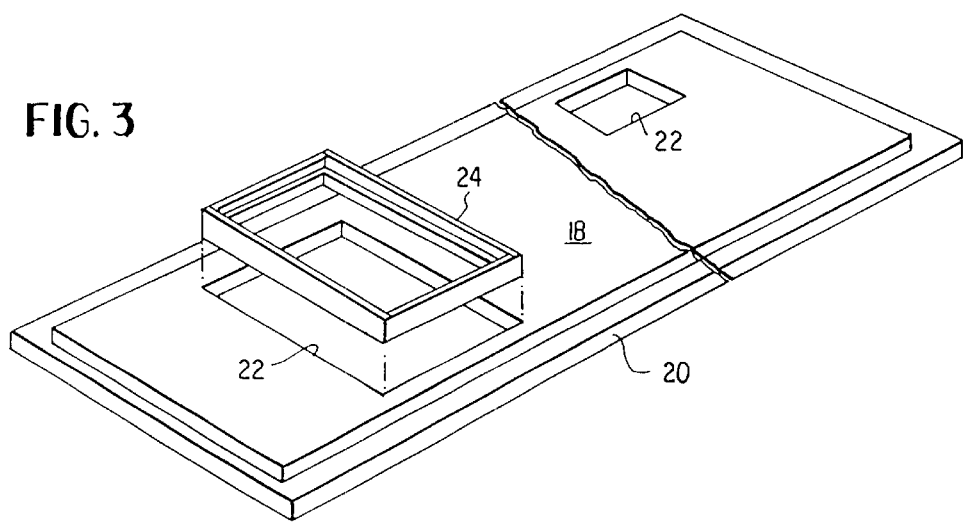
FIG. 3 is an oblique view of the slab with recesses formed therein.
Figure 4:
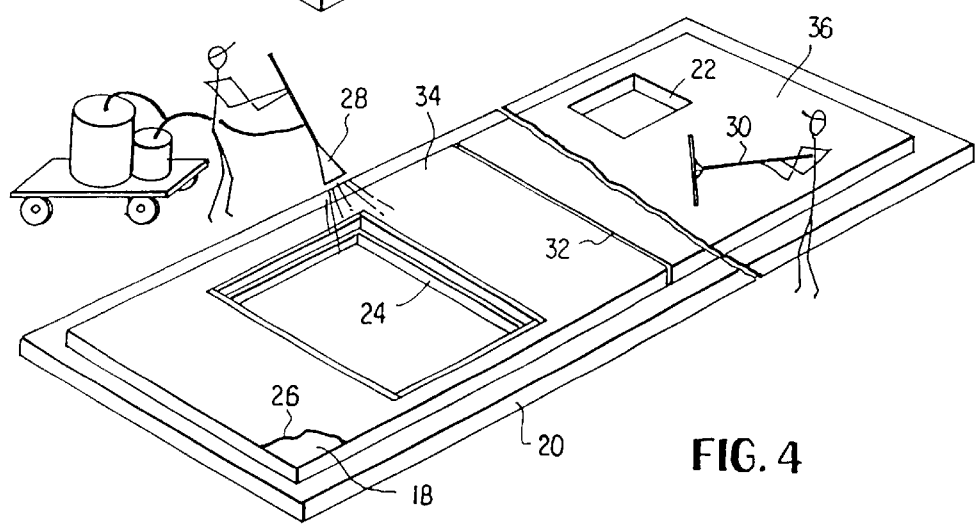
FIG. 4 is an oblique view of the slab being covered with a layer of resinous material and cut into sections to form the side and ceiling members.

The shell 12 is constructed by the method steps depicted in FIGS. 2–5 and comprises an elongated slab of low density, foamed synthetic resin material such as polyurethane about 4 inches in thickness, as shown in FIG. 1. The slab 18 is typically placed on a horizontal forming pallet 20 resting on the floor. When side panels are being formed, the width dimension (a) would be substantially the interior height of the enclosure and where the base and roof panels are being made, the dimension (a) would be substantially the exterior width of the enclosure. Next door, window and other openings 22 are cut into the slab 18 which represent desired passageways through the panels of the finished enclosure. A door jamb 24, typically made of wood, would then be positioned in the opening 22, as shown in FIG. 2. Frames (not shown) for other openings 22 would also be inserted at this time. A continuous layer 26 of polyester resin reinforced with a fibrous material such as filamentary glass in which the filaments are arranged in the resinous material at random is applied approximately ⅛ inch thick to the slab 18. Typically, the fiberglass reinforced resinous material 26 is applied in spray form with what is commonly referred to as a hand-held "chopper gun" 28 and smoothed into a continuous layer of uniform thickness by a T-shaped implement 30. The gun 28 chops fiberglass in the form of twine into short lengths, mixes it in the resin, and blows it against the slab 18. The layer of material 26 is applied over the entire exposed surface of the slab 18 as it rests on the pallet 20 including the door jamb 24 and other frame elements thereby securing them in place, as shown in FIG. 4. The layer of resinous material 26 is then permitted to cure or harden. After the layer 26 has cured, the slab 18 is cut as shown at 32 by a power saw or the like into panels 34, 36, 38 and 40 forming the sides of the enclosure 10 or to separate the base panel 42 from the roof panel 44. To complete the enclosure 10, the side panels 34, 36, 38 and 40 are erected on the base panel 42, as shown in FIG. 5, and the roof panel 44 is placed on top such that the side of the panels containing the layer of material 26 is faced inwardly.

Figure 6:
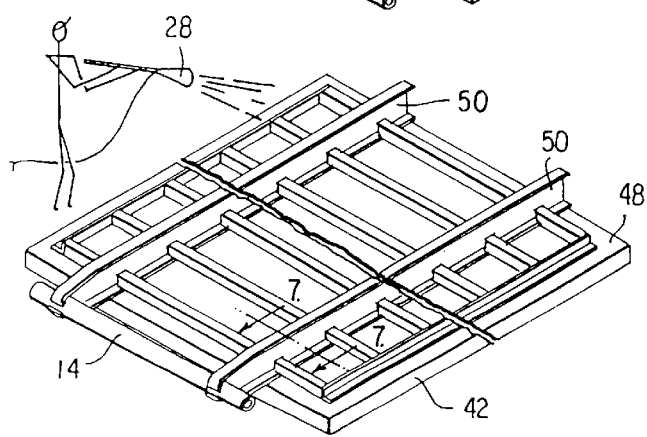
FIG. 6 is an oblique view showing the skid being attached to the base by coating material.
Figure 7:
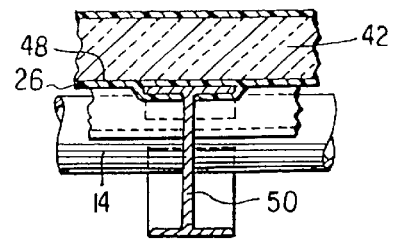
FIG. 7 is an enlarged fragmenting view in cross-section taken along the likes 7—7 of FIG. 6.

After the erection of the side, base and roof panels to form the enclosure 10, the outside surface of the panels is covered with a layer of resinous material 26 by means of the chopper gun 28 to thereby form a continuous surface including all abutting joints 46. To complete this part of the enclosure 10, a transport skid 14 may be attached to the bottom 48 of the base 42 by the means disclosed in my aforementioned U. S. patent and shown in FIGS. 6 and 7. The bottom surface 48 is first covered with a layer of resinous material 26 and allowed to cure. The skid 14 is then positioned on the cured layer and secured thereto by means of the same resinous material 26 shown surrounding the I-beam member 50. Attachment of the skid 14 to the base 42 in this manner eliminates the necessity of fasteners which could penetrate the covering layer of resinous material 26 permitting moisture, etc. to enter.

Figure 8:
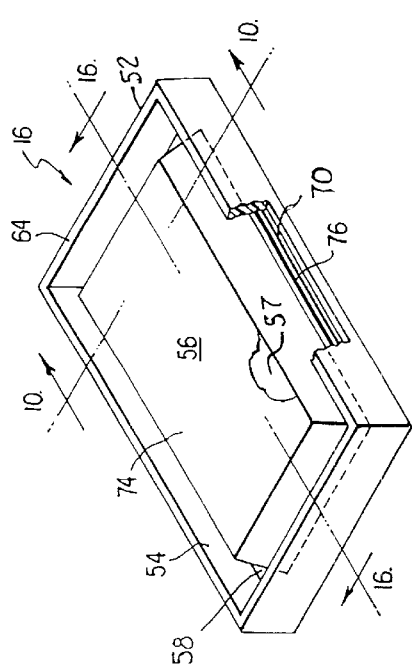
FIG. 8 is a perspective view in partial cutaway of the closure member or door constructed by the method of the present invention depicted in the mold in which it was constructed.

Referring now to FIG. 8, the closure member or door 16 for the enclosure 10 is shown positioned in the shallow, rectangular-shaped mold 52 having a cavity 54. The closure member 50 has a raised central portion 56 containing polyurethane insulation 57 and a peripheral lip portion 58 around the central portion and having a channel 60 embedded therein for retaining a door seal 62. The mold 52 is essentially a rectangular-shaped five-sided enclosure having a peripheral wall 64 and a bottom 66 having a highly polished surface 67 to ensure quick release and the impartation of a highly smooth blemish-free outside surface for the closure member 16.

Figure 9:
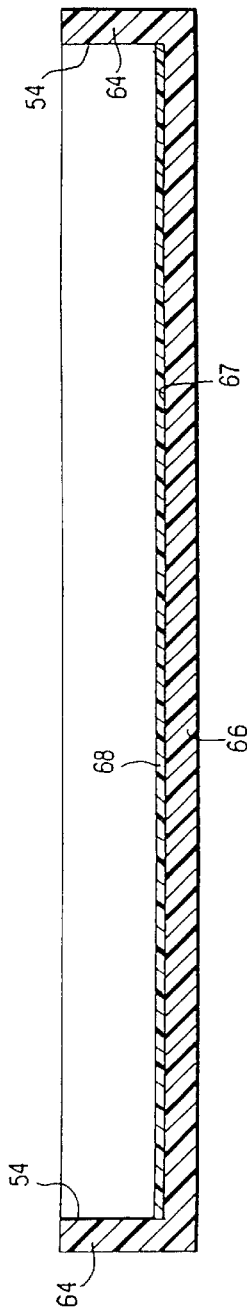
FIG. 9 is a cross-sectional view taken along lines 10—10 of FIG. 8 showing the first step of the method for forming the closure member.
Figure 10:
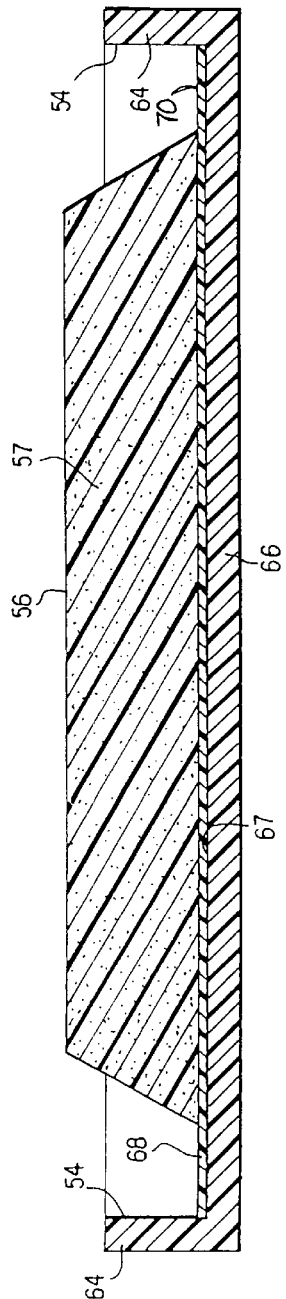
FIG. 10 is a cross-sectional view taken along lines 10—10 of FIG. 8 showing the second step of the method for forming the closure member.
Figure 11:
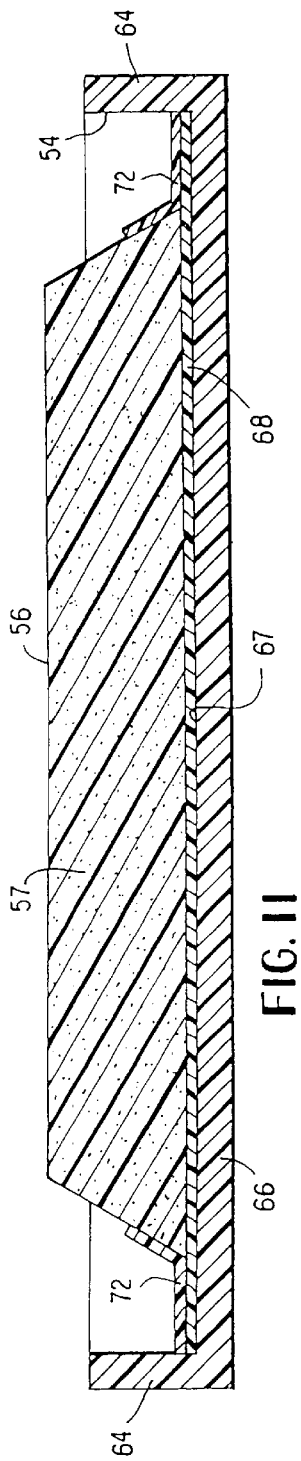
FIG. 11 is a cross-sectional view taken along lines 10—10 of FIG. 8 showing the third step of the method for forming the closure member.
Figure 12:
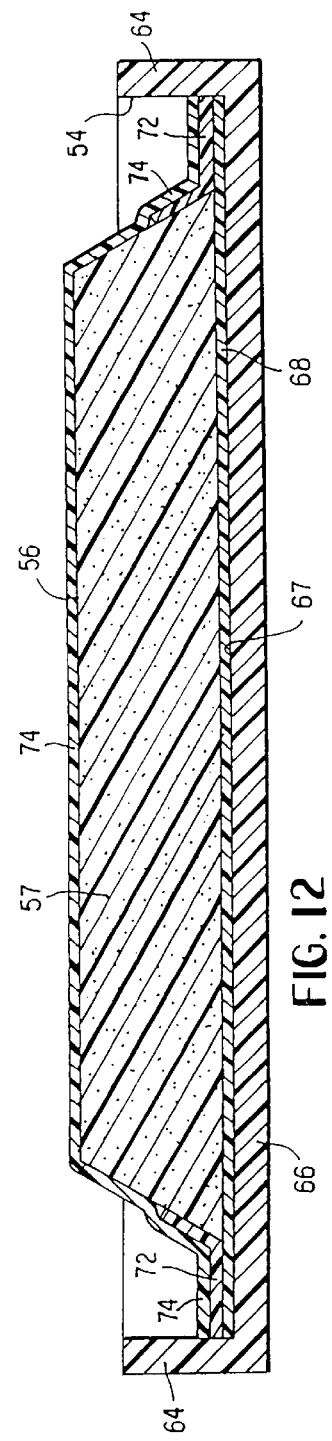
FIG. 12 is a cross-sectional view taken along lines 10—10 of FIG. 8 showing the fourth step of the method for forming the closure member.
Figure 13:
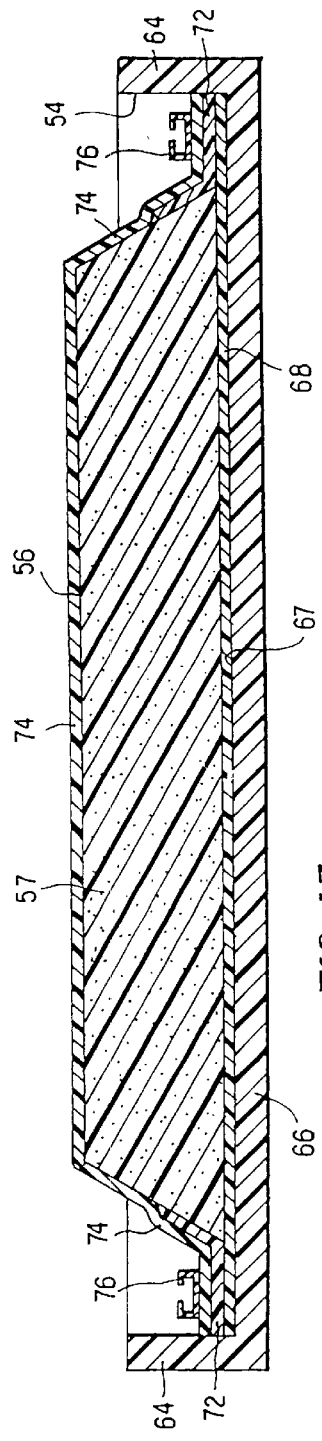
FIG. 13 is a cross-sectional view taken along lines 10—10 of FIG. 8 showing the fifth step of the method for forming the closure member.
Figure 14:
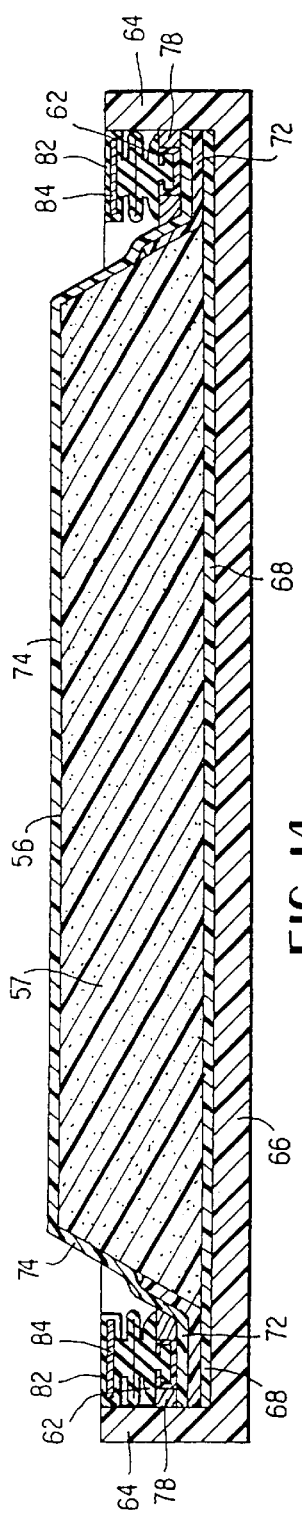
FIG. 14 is a cross-sectional view taken along lines 10—10 of FIG. 8 showing the sixth step of the method for forming the closure member.

To construct the closure member 16, FIGS. 9–14 depict the method steps involved. More specifically, in FIG. 9, the mold 52 is shown having the aforementioned highly polished surface 67. On this surface 67 is placed at least one layer 68 of fiberglass, reinforced resinous material, extending to the side walls 64 of the mold 52. Preferably, three layers of the material 68 are placed on this polished surface 67 but only one is shown here in the interests of clarity. Next, as shown in FIG. 10, a core 57 of polyurethane insulation, preferably of at least three inches in thickness, is placed on the aforementioned still wet fiberglass 68 and equi-spaced a distance from the walls 64 to thereby form a border 70 around the core 57. Next, as shown in FIG. 11, at least one border layer 72 is placed on the still wet fiberglass 68 extending from the wall 64 and up a distance on the side 74 of the core 57. Preferably, three border layers 72 are laid on the still wet fiberglass bottom layer 68. As an alternative, a strip of wood (not shown) can be substituted for the two border layers 72 closest to the bottom layer 68. Next, as shown in FIG. 12, at least one cover layer 74 is placed on the still wet border layer 72 and the entire outer surface 76 of the core 57. Preferably, two cover layers 74 are laid on the still wet border layer 72 and core 57. Next, as shown in FIG. 13, a substantially longitudinally extending U-shaped channel 76 of plastic material is placed on the still wet border layer 72 intermediate the wall 64 and the core 57 around the entire border layer 72. Finally, as seen in FIG. 14, a quantity of resinous material 78 such as gel-coat is applied around the channel 76 to secure it to the border layer 72, and all layers are permitted to set up until hard. Also, a length of flexible sealing strip 62 is inserted into channel 76 to complete the closure member 50. The sealing strip 62 can be provided with a longitudinally extending pocket 82 for receiving a strip of magnetized, flexible material 84 for sealing the door periphery when the strip 62 is brought in contact with a metal border around the door opening 22 (not shown).

Figure 15:
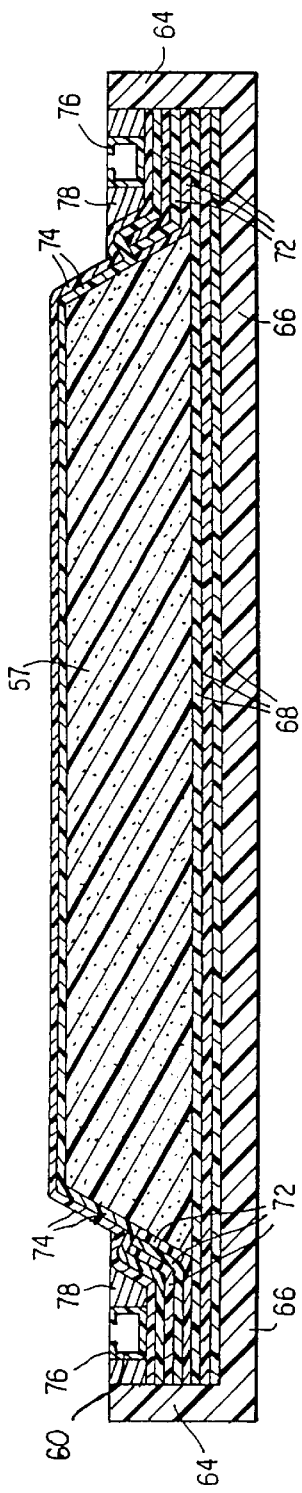
FIG. 15 is a partial view in cross-section showing an alternative construction employing the six method steps for forming the closure member.

Referring now to FIG. 15, there is shown a partial view of a door 16 comprising the preferred construction if a more substantial or heavier door is desired, which consists of three layers 68 of fiberglass, reinforced resinous material, followed by three border layers 72 of similar material and then followed by two cover layers 74; or, as an alternative, a top border layer 72 and a strip of wood (not shown) can be substituted for two of the border layers 72.

Figure 16:
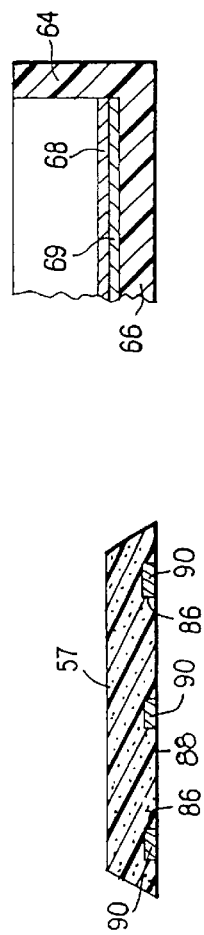
FIG. 16 is a cross-section view of the closure member or door taken along the lines 16—16 of FIG. 8.

FIG. 16 shows a core 57 having three rectangular-shaped channels 86 cut in the face 88 thereof. Lengths of wood 90 are secured in the channels 86 before the core 57 is placed on the initial layer(s) 68 to provide a means to anchor screws for door hinges and lock hardware (not shown).

Figure 17:
FIG. 17 is a partial cross-section view of another embodiment of the closure member.

FIG. 17 is a variation of the present invention of FIG. 9 wherein a thin layer of gelcoat 69 is first placed on the mold cavity surface 67 and permitted to set up. This gelcoat layer 69 serves to both impact the smooth surface 67 to the front of the closure member 16 as well as fill in any minor voids present in the first layer of fiberglass 68 which is then laid thereon. Various colors can be added to the gelcoat layer 69 if desired.

In order to provide a textured surface 92 to the inside floor formed by the base 42, an additional layer of resinous material 94 can be applied to the hardened layer 26, as shown in FIG. 5. A layer of sand 96 is then applied evenly over the additional layer 94. The sand 96 can be a mixture of equal parts of light and dark sand for a varied appearance; and, finally, a cover layer 98 of clear epoxy resin is applied over the sand layer 96 and permitted to harden, thus resulting in a mildly rough, slip resistant surface even when wet.

What is claimed is:

1. A method of providing a textured surface to the floor of a refrigerated storage enclosure comprising the steps of:
   a) applying a layer of resinous material over the surface of said floor, the surface being formed of a hardened material;
   b) placing a single layer of sand on said layer of resinous material; and
   c) applying a layer of clear epoxy resin over said layer of sand, wherein the layer of clear epoxy resin applied over the layer of sand is permitted to harden.

2. The method of providing a textured surface to the floor of a refrigerated storage enclosure as set forth in claim 1, wherein the layer of sand is a multicolored mixture providing for a varied appearance when viewed through the epoxy resin covering the layer of sand.

3. The method of providing a textured surface to the floor of a refrigerated storage enclosure according to claim 1, wherein the clear epoxy resin which forms a slip-resistant surface even when wet.

4. The method of providing a textured surface to the floor of a refrigerated storage enclosure according to claim 1, wherein the layer of sand is evenly applied.

* * * * *